(12) United States Patent
Li et al.

(10) Patent No.: US 9,896,539 B2
(45) Date of Patent: Feb. 20, 2018

(54) METHOD FOR SYNTHESIZING POLY(BUTYLENE ADIPATE-CO-TEREPHTHALATE)

(71) Applicant: Nanjing University, Nanjing (CN)

(72) Inventors: Hong Li, Nanjing (CN); Quanxing Zhang, Nanjing (CN); Xiangqian Sun, Nanjing (CN); Yunlong Xu, Nanjing (CN); Wei Huang, Nanjing (CN); Aimin Li, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 15/263,322

(22) Filed: Sep. 12, 2016

(65) Prior Publication Data

US 2016/0376403 A1    Dec. 29, 2016

Related U.S. Application Data

(63) Continuation-in-part of application No. PCT/CN2016/076958, filed on Mar. 22, 2016.

(30) Foreign Application Priority Data

Apr. 13, 2015 (CN) .......................... 2015 1 0173430

(51) Int. Cl.
*C08G 63/183* (2006.01)
*C08G 63/85* (2006.01)
*C08G 63/87* (2006.01)
*C08G 63/80* (2006.01)

(52) U.S. Cl.
CPC ........... *C08G 63/87* (2013.01); *C08G 63/183* (2013.01); *C08G 63/80* (2013.01); *C08G 63/85* (2013.01)

(58) Field of Classification Search
CPC ...... C08G 63/183; C08G 63/80; C08G 63/85; C08G 63/87
See application file for complete search history.

(56) References Cited

U.S. PATENT DOCUMENTS

| 2,970,986 | A | * | 2/1961 | Woodward | C08G 63/87 528/272 |
| 3,254,054 | A | * | 5/1966 | Boerma | C08G 63/87 528/274 |
| 8,367,796 | B2 | * | 2/2013 | Hedrick | C08G 63/183 502/150 |
| 9,469,724 | B2 | * | 10/2016 | Li | C08G 63/16 |
| 2011/0039999 | A1 | * | 2/2011 | Witt | C08G 18/4219 524/210 |
| 2016/0083511 | A1 | * | 3/2016 | Alidedeoglu | C08G 63/78 521/48.5 |

* cited by examiner

*Primary Examiner* — Ling Choi
*Assistant Examiner* — Gennadiy Mesh
(74) *Attorney, Agent, or Firm* — Matthias Scholl, PC; Matthias Scholl

(57) ABSTRACT

A method for synthesizing poly(butylene adipate-co-terephthalate) by combination of melt and solid state polycondensation using an organic guanidine as a main catalyst. The ternary catalyst system includes a main catalyst, a first cocatalyst, and a second cocatalyst. The main catalyst is organic guanidine; the first cocatalyst is titanate ester or zirconate ester; and the second cocatalyst is metallic oxide. The method includes: 1) adding 1,4-butanediol (BDO), adipic acid (AA), terephthalic acid (TA), and a ternary catalyst system to a reaction still; conducting an oligopolycondensation to yield a oligomer having the weight average molecular weight ($M_w$) of between $3.0 \times 10^3$ and $4.0 \times 10^3$; allowing the oligomer to perform a melt polycondensation (MP) to yield a prepolymer with medium $M_w$ of between $1.5 \times 10^4$ and $3.0 \times 10^4$; and 2) crushing the solid prepolymer into granules of 30-40 meshes, and then allowing the granules to undergo solid state polycondensation to yield the final PBAT product.

4 Claims, No Drawings

METHOD FOR SYNTHESIZING POLY(BUTYLENE ADIPATE-CO-TEREPHTHALATE)

CROSS-REFERENCE TO RELATED APPLICATIONS

This application is a continuation-in-part of International Patent Application No. PCT/CN2016/076958 with an international filing date of Mar. 22, 2016, designating the United States, now pending, and further claims priority benefits to Chinese Patent Application No. 201510173430.8 filed Apr. 13, 2015. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a method for synthesizing poly(butylene adipate-co-terephthalate) (PBAT).

Description of the Related Art

Typically, two processes are used for the synthesis of poly(butylene adipate-co-terephthalate) (PBAT), one based on dimethyl terephthalate (DMT) via transesterification and the other based on terephthalic acid (TA) via esterification. Compared with the DMT process, the TA process was conducted without producing any flammable, explosive and toxic methanol. But, the TA process based on melt polycondensation generally requires high reaction temperature, and the resulting product has inferior color, wide molecular weight distribution, and poor thermomechanical properties.

SUMMARY OF THE INVENTION

In view of the above-described background, it is one objective of the invention to provide a method for synthesizing poly(butylene adipate-co-terephthalate) (PBAT) via combination of melt polycondensation and solid state polycondensation (MP-SSP) using a ternary catalyst system comprising organic guanidine as a main catalyst. The resulting PBAT product has a weight average molecular weight ($M_w$) of between $1.55 \times 10^5$ and $2.40 \times 10^5$, a narrow molecular weight distribution (polydispersity index PDI is between 1.50 and 1.90), and fine color (snow white).

To achieve the above objective, in accordance with one embodiment of the invention, there is provided a method for synthesizing poly(butylene adipate-co-terephthalate) (PBAT) via MP-SSP using organic guanidine as a main catalyst. The method comprises the following steps:

adding 1,4-butanediol (BDO), adipic acid (AA), terephthalic acid (TA), and a ternary catalyst system to a reaction still; conducting a oligo-polycondensation at a temperature of between 180 and 220° C. under atmospheric pressure for 3 to 6 hours to yield a oligomer with a weight average molecular weight ($M_w$) of between $3.0 \times 10^3$ and $4.0 \times 10^3$; allowing the oligomer to perform a melt polycondensation (MP) at a temperature of between 220 and 240° C. under an absolute pressure of between 10 and 30 torr for 3 to 5 hours to yield a white solid prepolymer with medium $M_w$ of between $1.5 \times 10^4$ and $3.0 \times 10^4$; and crushing the prepolymer into granules of 30-40 mesh and allowing granules to undergo the solid state polycondensation (SSP) at a temperature of between 160 and 190° C. under an absolute pressure of between 0.5 and 3.0 torr for 9 to 13 hours to yield product PBAT with a high $M_w$.

The ternary catalyst system comprises a main catalyst, a first cocatalyst, and a second cocatalyst; the main catalyst is organic guanidine; the first cocatalyst is titanate ester or zirconate ester; and the second cocatalyst is metallic oxide.

The main catalyst accounts for 0.01%-0.05% of a total molar weight of adipic acid and terephthalic acid; a molar ratio of the main catalyst to the first cocatalyst is 1-2:1; and a molar ratio of the main catalyst to the second cocatalyst is 1-2:1.

In a class of this embodiment, the main catalyst is bicyclic guanidine (TBD), bicyclic guanidine acetate (TBDA), creatinine (CR), creatinine glutamate (CRGL), tetramethyl guanidine (TMG), or tetramethyl guanidine acetate (TMGA); the first cocatalyst is tetraisopropyl titanate (TPOT) or tetraisopropyl zirconate (TPOZ); the second cocatalyst is magnesium oxide (MgO), calcium oxide (CaO), or titanium dioxide ($TiO_2$). Specifically,

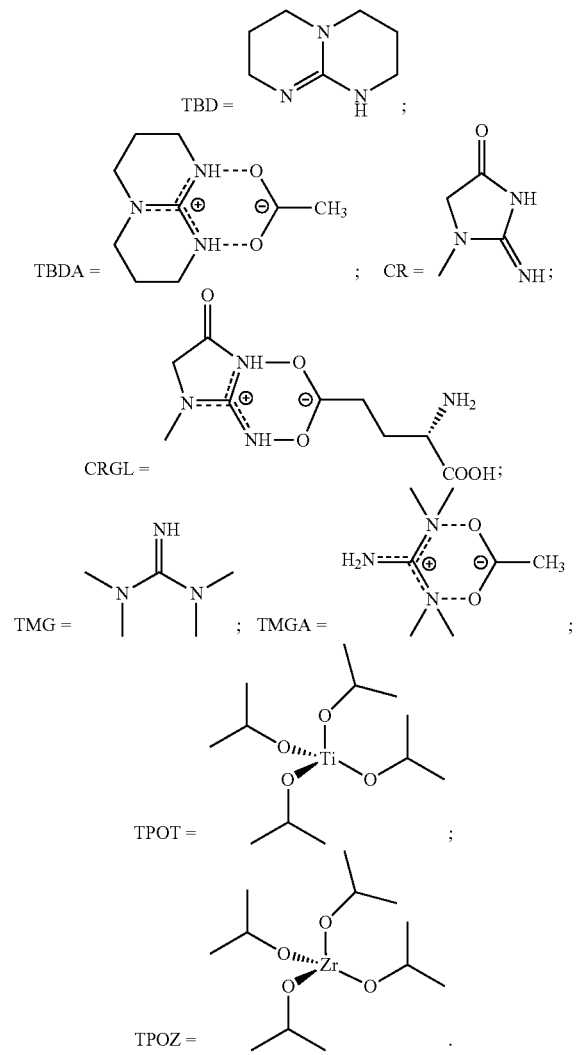

In a class of this embodiment, a molar ratio of adipic acid to terephthalic acid to 1,4-butanediol is 1:4:8-12.

In a class of this embodiment, the $M_w$ of the PBAT product changes between $1.55 \times 10^5$ and $2.40 \times 10^5$ according to actual needs. The PBAT product features narrow molecular weight distribution (PDI is between 1.50 and 1.90), and fine color (snow white).

Compared with the tradition DMT and TA processes, advantages of the method for synthesizing poly(butylene adipate-co-terephthalate) according to embodiments of the invention are given below:

1) The ternary catalyst system features high catalytic activity at low reaction temperature, low consumption and short reaction time.

2) The combination of MP-SSP is easy to operate and is convenient for industrial application. The resulting product PBAT has an appropriate molecular weight distribution and fine color (snow white).

DETAILED DESCRIPTION OF THE EMBODIMENTS

For further illustrating the invention, experiments detailing a method for synthesizing poly(butylene adipate-co-terephthalate) (PBAT) are described below. It should be noted that the following examples are intended to describe and not to limit the invention.

Example 1

TA (33.2 g, 0.20 mol), AA (7.3 g, 0.05 mol), BDO (36.05 g, 0.40 mol), CR (2.8 mg, 0.025 mmol), TPOT (8.5 mg, 0.025 mmol), and $TiO_2$ (2.0 mg, 0.025 mmol) were added to a reaction still. The oligo-polycondensation was conducted at 180° C. under argon atmosphere for 6 hours. The reaction still was heated to 220° C. at a rate of 5° C./min and the pressure was reduced to 10 torr to conduct the melt polycondensation. After 5 hours, the product was collected under argon atmosphere, and was cooled to room temperature. The weight average molecular weight ($M_w$) of the prepolymer was measured to be $1.5 \times 10^4$.

2.0 g of the solid prepolymer was crushed into granules and sieved out the granules of 30 meshes. The sieved prepolymer granules was put into a solid state polycondensation reactor. The solid state polycondensation lasted for 9 hours under 0.5 torr at 160° C. The $M_w$ of the product was measured to be $1.55 \times 10^5$, and a polydispersity index PDI was 1.50.

Example 2

TA (33.2 g, 0.20 mol), AA (7.3 g, 0.05 mol), BDO (36.05 g, 0.40 mol), TBDA (7.4 mg, 0.038 mmol), TPOT (8.5 mg, 0.025 mmol), and $TiO_2$ (2.0 mg, 0.025 mmol) were added to a reaction still. The oligo-polycondensation was conducted at 180° C. under argon atmosphere for 6 hours. The reaction still was heated to 220° C. at a rate of 5° C./min and the pressure was reduced to 10 torr to conduct the melt polycondensation. After 5 hours, the product was collected under argon atmosphere, and was cooled to room temperature. The weight average molecular weight ($M_w$) of the prepolymer was measured to be $1.8 \times 10^4$.

2.0 g of the solid prepolymer was crushed into granules and sieved out the granules of 30 meshes. The sieved prepolymer granules was put into a solid state polycondensation reactor. The solid state polycondensation lasted for 9 hours under 0.5 torr at 160° C. The $M_w$ of the product was measured to be $1.70 \times 10^5$, and a polydispersity index PDI was 1.55.

Example 3

TA (33.2 g, 0.20 mol), AA (7.3 g, 0.05 mol), BDO (45.06 g, 0.50 mol), CRGL (32.8 mg, 0.125 mmol), TPOZ (22.4 mg, 0.063 mmol), and CaO (3.5 mg, 0.063 mmol) were added to a reaction still. The oligo-polycondensation was conducted at 200° C. under argon atmosphere for 5 hours. The reaction still was heated to 230° C. at a rate of 5° C./min and the pressure was reduced to 20 torr to conduct the melt polycondensation. After 4 hours, the product was collected under argon atmosphere, and was cooled to room temperature. The weight average molecular weight ($M_w$) of the prepolymer was measured to be $2.0 \times 10^4$.

2.0 g of the solid prepolymer was crushed into granules and sieved out the granules of 30 meshes. The sieved prepolymer granules was put into a solid state polycondensation reactor. The solid state polycondensation lasted for 11 hours under 1.5 torr at 180° C. The $M_w$ of the product was measured to be $1.89 \times 10^5$, and a polydispersity index PDI was 1.73.

Example 4

TA (33.2 g, 0.20 mol), AA (7.3 g, 0.05 mol), BDO (45.06 g, 0.50 mol), TMG (7.2 mg, 0.063 mmol), TPOZ (22.4 mg, 0.065 mmol), and CaO (3.5 mg, 0.063 mmol) were added to a reaction still. The oligo-polycondensation was conducted at 200° C. under argon atmosphere for 5 hours. The reaction still was heated to 230° C. at a rate of 5° C./min and the pressure was reduced to 20 torr to conduct the melt polycondensation. After 4 hours, the product was collected under argon atmosphere, and was cooled to room temperature. The weight average molecular weight ($M_w$) of the prepolymer was measured to be $2.2 \times 10^4$.

2.0 g of the solid prepolymer was crushed into granules and sieved out the granules of 40 meshes. The sieved prepolymer granules was put into a solid state polycondensation reactor. The solid state polycondensation lasted for 11 hours under 1.5 torr at 180° C. The $M_w$ of the product was measured to be $2.15 \times 10^5$, and a polydispersity index PDI was 1.77.

Example 5

TA (33.2 g, 0.20 mol), AA (7.3 g, 0.05 mol), BDO (54.07 g, 0.60 mol), TBD (17.4 mg, 0.125 mmol), TPOT (21.3 mg, 0.063 mmol), and MgO (2.5 mg, 0.063 mmol) were added to a reaction still. The oligo-polycondensation was conducted at 220° C. under argon atmosphere for 3 hours. The reaction still was heated to 240° C. at a rate of 5° C./min and the pressure was reduced to 30 torr to conduct the melt polycondensation. After 3 hours, the product was collected under argon atmosphere, and was cooled to room temperature. The weight average molecular weight ($M_w$) of the prepolymer was measured to be $3.0 \times 10^4$.

2.0 g of the solid prepolymer was crushed into granules and sieved out the granules of 40 meshes. The sieved prepolymer granules was put into a solid state polycondensation reactor. The solid state polycondensation lasted for 13 hours under 3.0 torr at 190° C. The $M_w$ of the product was measured to be $2.28 \times 10^5$, and a polydispersity index PDI was 1.84.

Example 6

TA (33.2 g, 0.20 mol), AA (7.3 g, 0.05 mol), BDO (54.07 g, 0.60 mol), TMGA (21.8 mg, 0.125 mmol), TPOT (21.3 mg, 0.063 mmol), and MgO (2.5 mg, 0.063 mmol) were added to a reaction still. The oligo-polycondensation was conducted at 220° C. under argon atmosphere for 3 hours. The reaction still was heated to 240° C. at a rate of 5° C./min and the pressure was reduced to 30 torr to conduct the melt polycondensation. After 3 hours, the product was collected under argon atmosphere, and was cooled to room temperature. The weight average molecular weight ($M_w$) of the prepolymer was measured to be $2.8 \times 10^4$.

2.0 g of the solid prepolymer was crushed into granules and sieved out the granules of 40 meshes. The sieved prepolymer granules was put into a solid state polycondensation reactor. The solid state polycondensation lasted for 13 hours under 3.0 torr at 190° C. The $M_w$ of the product was measured to be $2.40 \times 10^5$, and a polydispersity index PDI was 1.90.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for synthesizing poly(butylene adipate-co-terephthalate) (PBAT) by combination of melt and solid state polycondensation (MP-SSP), the method comprising:
   a) adding 1,4-butanediol (BDO), adipic acid (AA), terephthalic acid (TA), and a ternary catalyst system to a reaction still; conducting a oligo-polycondensation at a temperature of between 180 and 220° C. under atmospheric pressure for 3 to 6 hours to yield a oligomer with a weight average molecular weight ($M_w$) of between $3.0 \times 10^3$ and $4.0 \times 10^3$; allowing the oligomer to perform a melt polycondensation (MP) at a temperature of between 220 and 240° C. under an absolute pressure of between 10 and 30 torr for 3 to 5 hours to yield a white solid prepolymer with medium $M_w$ of between $1.5 \times 10^4$ and $3.0 \times 10^4$; and
   b) crushing the prepolymer into granules of 30-40 mesh and allowing granules to undergo the solid state polycondensation (SSP) at a temperature of between 160 and 190° C. under an absolute pressure of between 0.5 and 3.0 torr for 9 to 13 hours to yield product PBAT with a high Mw;
wherein
   the ternary catalyst system comprises a main catalyst, a first cocatalyst, and a second cocatalyst;
   the main catalyst is bicyclic guanidine (TBD), bicyclic guanidine acetate (TBDA), creatinine (CR), creatinine glutamate (CRGL), tetramethyl guanidine (TMG), or tetramethyl guanidine acetate (TMGA); wherein

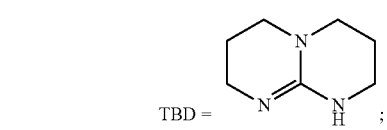

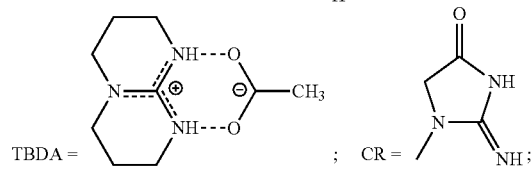

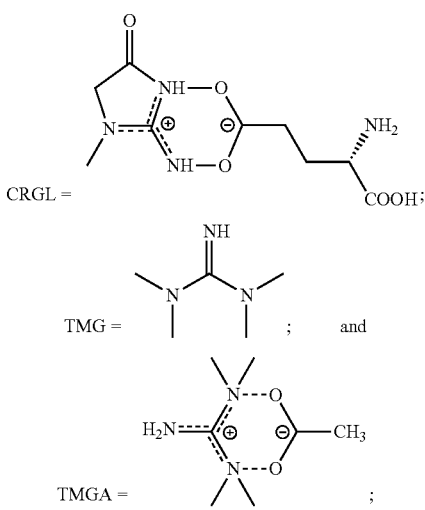

the first cocatalyst is titanate ester or zirconate ester;
the second cocatalyst is metallic oxide; and
the main catalyst accounts for 0.01%-0.05% of a total molar weight of adipic acid and terephthalic acid; a molar ratio of the main catalyst to the first cocatalyst is 1-2:1; and a molar ratio of the main catalyst to the second cocatalyst is 1-2:1.

2. The method of claim 1, wherein the first cocatalyst is tetraisopropyl titanate (TPOT) or tetraisopropyl zirconate (TPOZ); the second cocatalyst is magnesium oxide (MgO), calcium oxide (CaO), or titanium dioxide ($TiO_2$), wherein

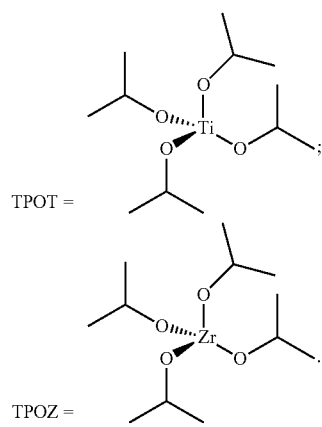

3. The method of claim 1, wherein a molar ratio of adipic acid to terephthalic acid to 1,4-butanediol is 1:4:8-12.

4. The method of claim 2, wherein a molar ratio of adipic acid to terephthalic acid to 1,4-butanediol is 1:4:8-12.